United States Patent [19]

Osman

[11] 4,228,029
[45] Oct. 14, 1980

[54] LIQUID CRYSTALLINE COMPOSITIONS

[75] Inventor: Maged A. Osman, Zurich, Switzerland

[73] Assignee: BBC Brown Boveri & Company Limited, Baden, Switzerland

[21] Appl. No.: 6,101

[22] Filed: Jan. 24, 1979

[30] Foreign Application Priority Data

Jan. 30, 1978 [CH] Switzerland ............................ 983/78

[51] Int. Cl.$^2$ ......................... G02F 1/13; C09K 3/34; C07C 69/74; C07C 69/76; C07C 121/46; C07C 121/60

[52] U.S. Cl. .................................... 252/299; 252/408; 260/465 D; 260/465 E; 350/350 R; 560/1; 560/11; 560/17; 560/43; 560/61; 560/73; 560/106; 560/125; 560/126; 560/179

[58] Field of Search ................ 252/299, 408; 350/350; 260/465 D, 465 E, 563 C, 570.5 CA, 577; 560/11, 1, 17, 179, 43, 61, 73, 106, 125, 126

[56] References Cited

U.S. PATENT DOCUMENTS

| | | | |
|---|---|---|---|
| 3,876,286 | 4/1975 | Deutscher et al. | 252/299 |
| 3,947,375 | 3/1976 | Gray et al. | 252/299 |
| 3,983,049 | 9/1976 | Aftergut et al. | 252/299 |
| 4,002,670 | 1/1977 | Steinstrasser | 252/299 |
| 4,003,844 | 1/1977 | Sorkin | 252/299 |
| 4,011,173 | 3/1977 | Steinstrasser | 252/299 |
| 4,058,478 | 11/1977 | Boller et al. | 252/299 |
| 4,122,026 | 10/1978 | Osman | 252/299 |
| 4,130,502 | 12/1978 | Eidenschink et al. | 252/299 |
| 4,154,697 | 5/1979 | Eidenschink et al. | 252/299 |

FOREIGN PATENT DOCUMENTS 2350390 12/1977 France ................................ 252/299
105701 5/1974 German Democratic Rep. ...... 252/299
132591 10/1978 German Democratic Rep. ...... 252/299

OTHER PUBLICATIONS

Osman, M., Z. Naturforsch, vol. 34b, pp. 1092–1095, (1979).

*Primary Examiner*—Teddy S. Gron
*Attorney, Agent, or Firm*—Oblon, Fisher, Spivak, McClelland & Maier

[57] ABSTRACT

Liquid crystalline compositions, especially for displays with a twisted nematic phase, comprising at least one compound of the formula

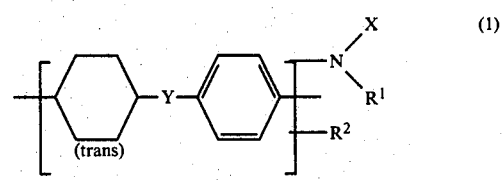

(1)

wherein X=H, —CHO or —CH$_3$, R$^1$=C$_1$—C$_{10}$ alkyl, R$^2$ is a monovalent organic group, for example, —CN; and Y is a single bond or one of the groups —COO— or

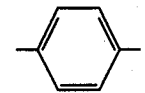

The compositions show a high positive dielectric anisotropy ($\Delta\epsilon$), a high $\Delta$n, and a low viscosity, and the mixture system may comprise relatively few components.

11 Claims, No Drawings

LIQUID CRYSTALLINE COMPOSITIONS

BACKGROUND OF THE INVENTION

1. Field of the Invention

The invention concerns liquid crystal (LC) compositions, such as they are used for electrooptic displays with a twisted nematic liquid crystalline phase (so-called twisted nematic displays or turned nematic cells).

2. Description of the Prior Art

Twisted nematic displays are known in the prior art, see M. Schadt and W. Helfrich, Applied Physics Letters, 18/1971/127. They are prepared on a large technical scale especially for digital displays, for example, in watches, small computers and the like.

A "liquid-crystal" is used as dielectric between the electrodes of such display cells, i.e., a substance which, during the temperature-dependent solid/liquid phase transformation, forms at least one intermediary liquid phase (mesophase), in which the molecules are oriented, and therefore arranged relatively to each other. This arrangement of molecules of a liquid mesophase causes the electric and optic manifestations of anistropy which are required for the operation of the liquid crystal displays.

For liquid crystal displays with a twisted nematic phase, liquid crystal substances with a nematic orientation of molecules in the desired temperature range and with a positive dielectric constant anistropy are required. In such substances, the dielectric constant of the liquid crystal parallel to the molecular axis ($\epsilon_{\parallel}$) must be larger than the dielectric constant vertical to the molecular axis ($\epsilon_{\perp}$). Dielectric constants may, for example, be measured according to the method described in the Z. Naturforschung (J. of Physics) 29a (1974) 905. The magnitude of the positive value of the difference $\epsilon_{\parallel} - \epsilon_{\perp}$ is the measurement for the positive dielectric constant anisotropy and is generally symbolized by $\Delta\epsilon$.

For the operating capacity of the liquid crystal displays it is also important that the liquid crystalline mesophase be maintained underall temperature conditions that can normally be expected, typically at temperatures in the range of 0° C. or less, up to 65° C. or more. The lower limits of this range are determined by the temperature of the transformation crystalline/nematic-liquid crystalline (C/LC). The higher limits are determined by the temperature of the transformation nematic-liquid crystalline-isotropic-liquid (LC/LI or clarification point).

Finally, the liquid crystalline substance in the anisotropic liquid range must have a sufficiently low viscosity and must niether show undesired chemical or physical changes. These properties must also include the physical characteristics of the mixture system under the operational conditions of the cell. It is particularly important that the properties hold under the characteristics of the liquid crystal substance when in the form of a thin layer of a thickness of about 10 micrometers.

Up to now, no single chemical compound has become known which optimally fulfills all these criteria. The technically usable liquid crystal compositions are mixtures of various substances (see, for example, DE-OS Nos. 2,321,632; 2,450,088 and 2,502,904 as well as U.S. Pat. No. 3,951,846). The significant requirement with respect to a liquid crystal composition which meets the above-mentioned criteria, that the mixture be as simple as possible, i.e., that it be composed of few compounds, can be met according to a proposal of the applicant (Swiss Patent Application No. 15,978/77), by means of mixtures which contain at least a first compound of the formulas (10), (11)

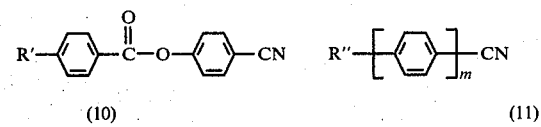

in which R' is an alkyl-group with 1 to 10 C-atoms in an essentially straight chain; R" is an alkyl- or alkoxy-group with 1 to 10 C-atoms in an essentially straight chain and m is two or three, together with at least a second compound of the formula (12)

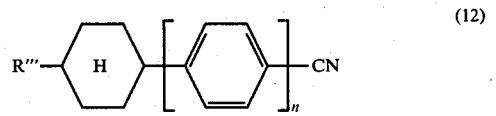

wherein H denotes that the six-membered ring is fully hydrogenated; in which R''' is equivalent to R' and n is one or two; and also a third compound which corresponds to one of the formulas (10), (11) or (12), but which is different from the first as well as from the second aforementioned compounds. Suitable compounds of the formulas (10), (11) and (12) are known.

Another proposal of the present applicant (Swiss Patent Application No. 5548/76) is to use as admixture for the increase of the positive dielectric constant anistropy of liquid crystal mixtures, new compounds of the formula (13)

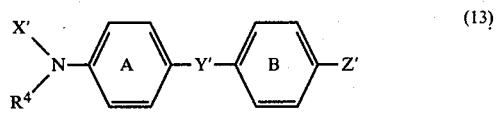

in which X' is hydrogen or the formyl group, $R^4$ is an alkyl group with up ro 8 C-atoms, Y' is a single bond between both rings A and B or Y' is a divalent organic residue selected from the group of azomethin-, carbonyloxy- and phenylene residues; and Z' is a monovalent, electron-withdrawing residue as, for example, a nitrile group, and wherein the rings A and B may be substituted, if necessary.

As was described in greater detail in the Swiss Patent Application No. 5548/76, herein incorporated by reference, liquid crystalline characteristics of known compounds carrying the dimethylamino group instead of the group

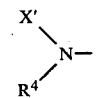

which is characteristic for the new compounds, were not determined. The new compounds (13) showed unexpected liquid crystalline or potential liquid crystalline characteristics and were therefore much better suited as admixture for an increase in $\Delta\epsilon$.

A need therefore continues to exist for liquid crystalline compounds which can form either singly or jointly liquid crystalline compositions with a wide temperature range, a low viscosity, a high positive dielectric anistropy, and a high anistropy of the refractive index.

SUMMARY OF THE INVENTION

Accordingly, one object of the invention is to provide novel compounds which can be used in liquid crystalline compositions.

Another object of the invention is to provide liquid crystalline compositions of high positive dielectric anistropy, low viscosity, high value of the anistropy of the refractive index and which have a wide temperature range.

Still another object of the invention is to provide liquid crystalline compositions useful for electrooptic displays with a twisted nematic liquid crystalline phase.

A further object of the invention is to provide liquid crystalline compositions wherein the number of components is kept to a minimum.

Briefly, these objects and other objects of the invention as hereinafter will become more readily apparent can be obtained by providing crystalline compositions especially for liquid crystal displays with twisted nematic phases comprising at least one compound of the formula (1)

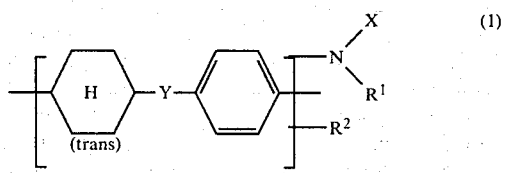

wherein X is hydrogen atom, formyl group or methyl group; $R^1$ is a $C_1$–$C_{10}$ alkyl group, $R^2$ is a monovalent organic group and Y is a single bond between the cyclohexyl and aryl radicals or Y is a carbonyloxy group or a p-phenylene residue.

DETAILED DESCRIPTION OF THE PREFERRED EMBODIMENTS

It has now been found that the amino-group which is characteristic of prior art compounds of formula (13) also offers advantages as a substituent in the case of cyclohexane compounds of the type of formula (12) as well as other cyclohexyl-aryl derivatives, especially when used as components of relatively simple, i.e., ternary or quaternary liquid, crystal mixture systems of the type described in the Swiss Application No. 15,978/77, which is herein incorporated by reference. These new compounds can also be used in the case of other nematic liquid crystal mixture systems, with completely positive and preferably highly positive ($\Delta\epsilon > 8$) dielectric constant anisotropy.

This invention therefore relates to nematic liquid crystal compositions which comprise at least one compound of the formula (1)

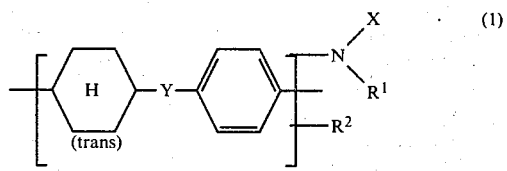

in which X is hydrogen, formyl group (—CHO) or methyl group; $R^1$ is an alkyl group with 1 to 10 C-atoms, $R^2$ is a monovalent organic group and Y is a single bond between the cyclohexyl and aryl groups or Y is a carbonyloxy group

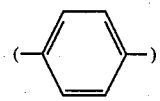

or a phenylene-1,4 residue.

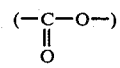

Generally, the trans-isomers of the formula (1) are especially preferred. When X is the methyl residue, when $R^1$ is preferably an alkyl with two or more C-atoms. Generally, all alkyls in compounds of the formula (1) are preferably essentially straight-chained.

Electron-withdrawing as well as electron-donating residues are suitable for monovalent residues $R^2$. Residues $R^2$ with low reaction capability, i.e., chemically relatively stable residues, are preferred for $R^2$. Preferred examples are alkyls with 1 to 10 C-atoms, alkoxy residues with 1 to 10 C-atoms, acyloxy residues with 2 to 10 C-atoms in the acyl group, or a nitrilo, nitro-, methylsulfonyl- or trifluoromethyl- group.

According to a preferred embodiment, the compounds (1) are those of the formula (1a)

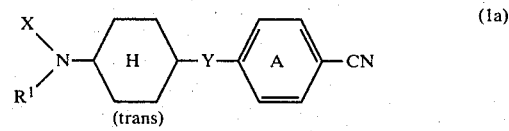

in which X, $R^1$ and Y have the above meaning, and the aromatic ring A, if necessary, carries one or more substituents, such as methyl. Compounds of the formula (1b)

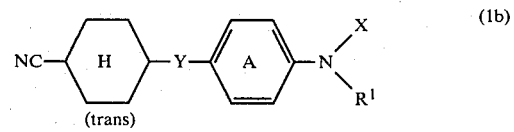

also offer new and advantageous liquid crystal substances according to the invention, wherein Y, X and $R^1$ have the indicated meaning. In this case, the aromatic ring A may also carry substituents.

The compounds of the formula (1) are novel and may be obtained according to customary methods of synthesis exemplified by the following reaction schemes:

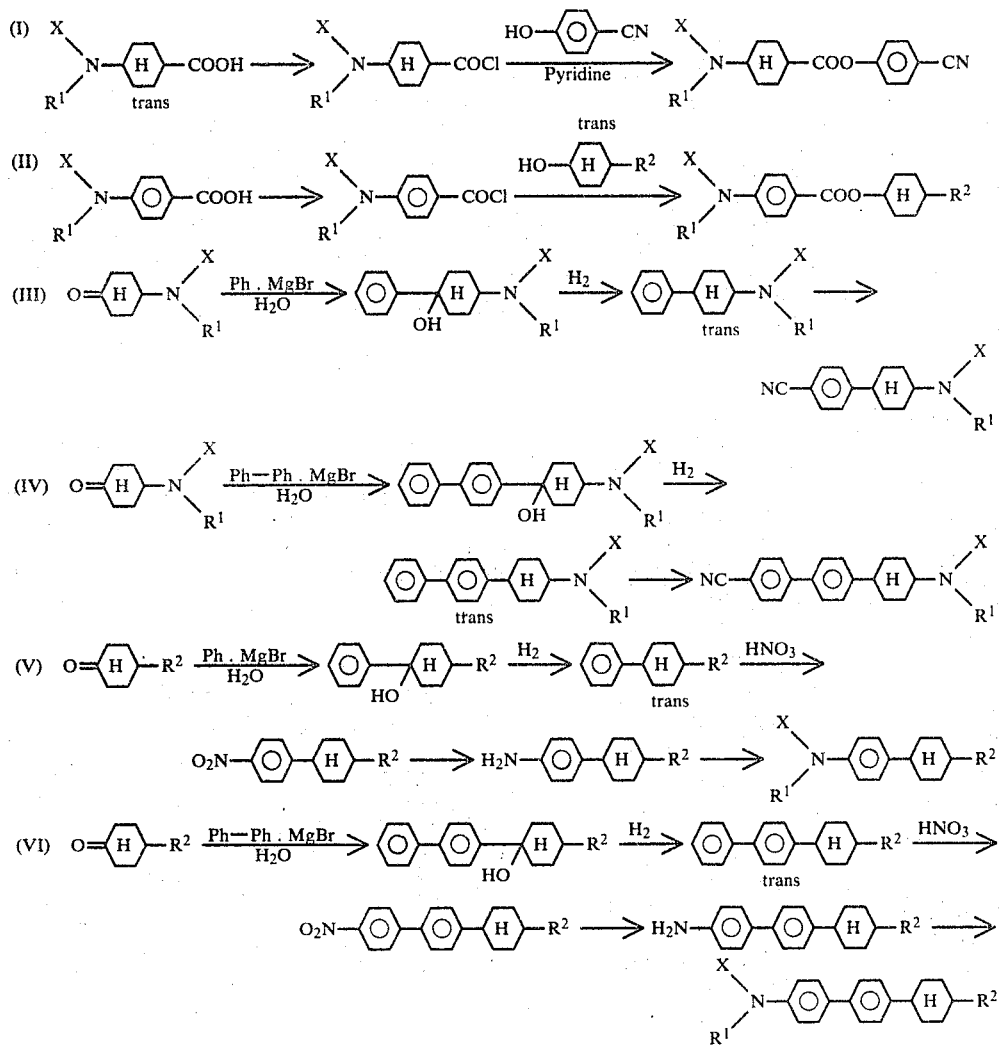

Compounds of the formula (1a), in which Y is a single bond, as for example, the two-core compounds of formula (15)

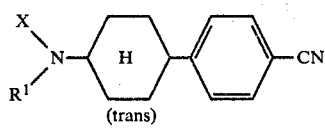

as well as the corresponding three-core compounds (Y=phenylene) of formula (16)

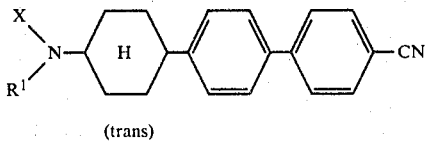

may be used practically analogously to the corresponding two-core or three-core aforementioned compounds of formula (12) in liquid crystal mixture systems according to the above-mentioned Swiss Patent Application No. 15,978/77.

The compounds of the invention give twisted nematic phases when added to LC compositions in proportions according to Table I, Examples A-G.

TABLE I

Examples of Proportional Ranges (Mole%) of the Components of Liquid Crystal Mixtures According to the Invention

| | A | B | C | D | E | F | G |
|---|---|---|---|---|---|---|---|
| Formula (1a) | 5-95 | 70-85 | 15-18 | 14-17 | 43-52 | 50-78 | 90-92 |
| Formula (15) | 0-92 | 59-65 | — | — | 30-52 | 37-61 | (49/54)[1] + (36/43)[2] |
| Formula (16) | 0-25 | 11-20 | 15-18 | 14-17 | 0-13 | 13-17 | |
| Formula (11) | 0-85 | — | 64-66 | 83-86 | 48-57 | 22-50 | 8-10 |

TABLE I-continued
Examples of Proportional Ranges (Mole%) of the Components of Liquid Crystal Mixtures According to the Invention

| | A | B | C | D | E | F | G |
|---|---|---|---|---|---|---|---|
| Formula (111)[3] | 0–85 | — | 64–66 | (64/75)[1] + (11/22)[2] | 39–55 | 22–50 | — |
| Formula (112)[4] | 0–25 | — | — | 0–12 | 0–12 | — | 8–10 |
| Formula (10) | 0–30 | 15–30 | 18–24 | — | — | — | — |

Notes:
[1],[2] Upper and lower limit of a compound mixed with another compound of the same formula
[3] Formula (111) = formula (11) for m = 2
[4] Formula (1112) = formula (11) for m = 3

The upper and lower limits indicated in Example A of Table I are not critical since, on the one hand, in the case of proportions of under 5 mole% of compound (1a), advantageous liquid crystalline compositions can be obtained, and on the other hand, liquid crystalline compositions according to the invention may also consist of several different compounds (1).

Preferred liquid crystalline compositions according to the invention are ternary or quaternary mixtures which contain at least one compound of the formula (1).

Generally, mixtures of compounds (1) offer advantages in that the liquid crystalline compositions prepared with them show an increase of positive dielectric constant anisotropy, a decrease of viscosity and an increase of the anisotropy of the refraction index. It is possible to obtain similarly good or better characteristics than for comparable composed mixtures indicated in the Swiss Patent Application No. 15,978/77.

Special advantages may be obtained especially with respect to a still higher increase of the positive dielectric constant anisotropy and the anisotropy of the refraction index. The last mentioned value which is called "Δn" is determined analogously to the above-mentioned Δε as the difference between the refraction index parallel ($n_\parallel$) to the molecular axis and the refraction index vertical ($n_\perp$) to the molecular axis. Δn has an important function: if this value, in the case of a given LC-composition, is too small, for example, smaller than 0.2, a liquid crystal display cell prepared with it will tend to form colored interference figures (Newton's rings) when the layer of thicknesses of the nematic phase is in the range of only 10 micrometers.

By means of the corresponding compounds (1), liquid crystalline compositions according to the invention can be obtained having Δn-values of 0.2 or more.

Having generally described this invention, a further understanding can be obtained by reference to certain specific examples which are provided herein for purposes of illustration only and are not intended to be limiting unless otherwise specified.

EXAMPLE 4 ml of pentyl iodide were added in drops to a solution of 5.9 g trans(4-aminophenyl)cyclohexane carboxylic acid nitrile in 45 ml diethylketone, containing 12.2 g $K_2CO_3$. The reaction mixture was heated to 95° C.

After the conclusion of the reaction, the mixture was poured on ice and extracted with methylene chloride, and the organic phase was washed with water. The product was subjected to chromatography on silica gel, and the thus obtained pentyl-amino-compound showed a melting point of 80.7° C. This compound showed a monotropic nematic phase, the clarification point of which was 17.0° C.

Having now fully described this invention, it will be apparent to one of ordinary skill in the art that many changes and modifications can be made thereto without departing from the spirit or scope of the invention set forth herein.

What is claimed as new and intended to be covered by letters patent is:

1. A liquid crystalline composition, especially for liquid crystal displays with a twisted nematic phase, comprising one liquid crystalline or potentially liquid crystalline compound and at least one compound of the formula (1)

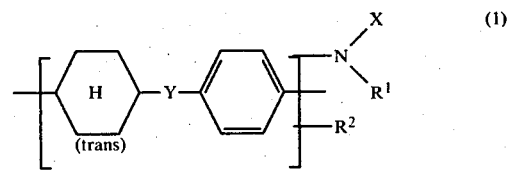

wherein X is a hydrogen atom, a formyl group or a methyl group; $R^1$ is a $C_1$–$C_{10}$ alkyl group, $R^2$ is selected from the group consisting of $C_1$–$C_{10}$ alkyl radicals, $C_1$–$C_{10}$ alkoxy radicals, $C_2$–$C_{10}$ acyloxy radicals, nitrile, nitro, methylsulfonyl and trifluoromethyl; and Y is a single bond between the cyclohexyl and aryl radicals or Y is a carbonyloxy group or a p-phenylene residue.

2. Liquid crystalline composition according to claim 1, wherein said compound (1) is represented by the formula (1a)

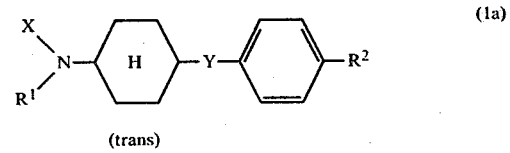

wherein $R^2$ is a nitrile group.

3. Liquid crystalline composition according to claim 1, wherein said compound (1) is represented by the formula (1b)

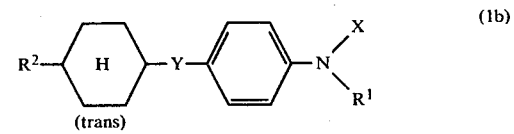

wherein $R^2$ is a nitrile group.

4. Liquid crystalline composition according to claim 3, wherein Y is a single bond or a p-phenylene-residue and wherein said compound (1a) is present in an amount of 5 to 95 mole% of said liquid crystalline composition.

5. Liquid crystalline composition according to claim 1, which contains at least two different compounds of formula (1).

6. Liquid crystalline composition according to claim 1, which is a tertiary or quaternary mixture.

7. Liquid crystalline composition according to claim 1, which is a mixture consisting exclusively of compounds of formula (1).

8. Liquid crystalline composition according to claim 2, which contain at least one compound of the formula (1a), in which Y is a single bond, and at least one compound of the formula (1a), in which Y is a p-phenylene residue.

9. A compound of the formula (1)

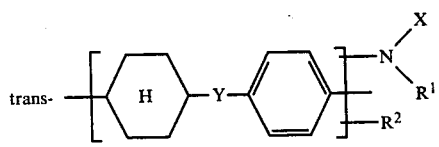

wherein X is a hydrogen atom, a formyl group or a methyl group; $R^1$ is a $C_1$–$C_{10}$ alkyl group, $R^2$ is selected from the group consisting of $C_1$–$C_{10}$ alkyl radicals, $C_1$–$C_{10}$ alkoxy radicals, $C_2$–$C_{10}$ acyloxyl radicals, nitrile, nitro, methylsulfonyl and trifluoromethyl; and Y is a single bond or Y is a carbonyloxy group or a p-phenylene residue.

10. A compound according to claim 9 of formula (1a)

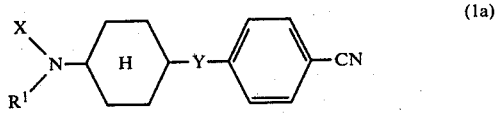

11. A compound of claim 9 of the formula (1d)

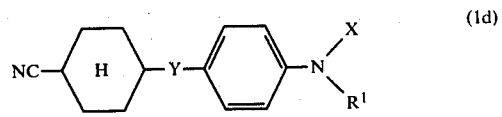

* * * * *